United States Patent
Glenn, Sr. et al.

[11] Patent Number: 5,818,712
[45] Date of Patent: Oct. 6, 1998

[54] EXPONENTIALLY-AMPLIFIED SAMPLING AND RECONSTRUCTION OF SIGNALS USING CONTROLLED ORBITS OF CHAOTIC SYSTEMS

[75] Inventors: Chance M. Glenn, Sr., Columbia; Scott T. Hayes, Silver Spring, both of Md.

[73] Assignee: Fractal Dynamics LLC, Silver Spring, Md.

[21] Appl. No.: 798,961

[22] Filed: Feb. 11, 1997

[51] Int. Cl.⁶ ................................................... G06F 19/00
[52] U.S. Cl. .................... 364/148.09; 364/158; 364/176; 380/49
[58] Field of Search ................ 364/148.01, 148.09, 364/148.1, 176, 152, 153, 154, 155, 158, 159, 194, 400, 717.01, 717.02; 380/46, 48, 28, 49, 50, 59

[56] References Cited

U.S. PATENT DOCUMENTS

| | | | |
|---|---|---|---|
| 5,291,555 | 3/1994 | Cuomo et al. | 364/717.01 X |
| 5,402,334 | 3/1995 | Pecora et al. | 364/158 |
| 5,432,697 | 7/1995 | Hayes | 364/158 |
| 5,510,976 | 4/1996 | Tanaka et al. | 364/176 X |
| 5,680,462 | 10/1997 | Miller et al. | 380/46 X |
| 5,729,607 | 3/1998 | Defries et al. | 380/6 |

*Primary Examiner*—Joseph Ruggiero
*Attorney, Agent, or Firm*—Whitham, Curtis & Whitham

[57] ABSTRACT

A system and method for sampling and reconstructing weak signals using the non-linear/chaotic dynamics of a chaotic system. Continuous-time disturbance signals introduced into a chaotic system are detected, amplified, and reconstructed from the discrete-time perturbations needed to maintain a controlled periodic orbit in the chaotic system.

43 Claims, 6 Drawing Sheets

EXPONENTIALLY-AMPLIFIED SAMPLING AND RECONSTRUCTION OF SIGNALS USING CONTROLLED ORBITS OF CHAOTIC SYSTEMS

CROSS REFERENCE TO RELATED APPLICATION

The present invention contains substitute matter which is related to co-pending application Ser. No. 08/790,238, filed on Jan. 28, 1997, entitled "TECHNIQUE FOR CONTROLLING THE SYMBOLIC DYNAMICS OF CHAOTIC SYSTEMS", which is incorporated by reference.

FIELD OF THE INVENTION

The present invention relates to systems and methods for detecting signals. More specifically, the present invention defines systems, and methods for exponentially amplifying, sampling and reconstructing signals.

BACKGROUND OF THE INVENTION

There are many applications in which it is useful to detect relatively weak signals. While any signal can be amplified, in weak signals, the signal-to-noise ratio is typically quite low. Since amplification of any signal will also amplify noise, detecting and reconstructing a weak signal is difficult using current signal processing techniques. While many advances have been made in noise filtering and signal detection, a need still exists for improved techniques of detecting, amplifying and reconstructing weak signals.

The present inventors have recognized that chaotic dynamical systems have the potential to be used as amplifiers. This is because these systems exhibit exponential sensitivity to initial conditions. It is thus an object of the invention to exploit the exponential sensitivity of chaotic dynamics to small perturbations to detect the presence of weak signals. In particular, it is an object of the invention to exponentially amplify, sample and reconstruct weak signals. "Exponential amplification" is defined as an increase in the amplitude of a given signal coupled into a chaotic system due to the exponentially divergent properties of the chaotic system.

In general, chaos theory provides a framework for understanding irregular or erratic fluctuations in nature. Chaotic systems are found in many fields of science and engineering. A chaotic system can be defined as any dynamical system that exhibits exponential sensitivity to small changes, yet remains bounded in a state-space for a finite time. Because of this property any uncertainty in the initial state of the given system, no matter how small, will lead to rapidly growing errors in any effort to predict the future behavior.

For example, the motion of a dust particle floating on the surface of a pair of oscillating whirlpools can display chaotic behavior. The particle will move in well defined paths around the centers of the whirlpools, alternating between the two in an irregular manner. To predict the motion of this particle the initial location must be measured with infinite precision; otherwise the observer will instead obtain the location of an imaginary particle very close by the particle. The imaginary particle will follow a path that diverges from the path of the real particle. This makes long term prediction of the trajectory of the real particle virtually impossible. Hence the system is chaotic.

The dynamics of a chaotic system may be described by deterministic, nonlinear, sets of equations. Solutions to the equations are highly disordered and may appear to be random. Hence if one does not know the equations of motion the chaotic signals may be indistinguishable from random processes or noise, even though the chaotic signals are actually self-oscillatory and not driven by noise. The apparent randomness of the solutions results from the very high sensitivity to small variations in initial conditions.

Nevertheless, chaotic systems are deterministic and not random. In a random process each fluctuation is a new and useful piece of information which does not repeat, or depend for meaning, on the old piece of information. The information content of a random process cannot be controlled. On the other hand, chaotic systems are deterministic (they have positive entropy) and thus their behavior can be manipulated. For example, chaotic states can be coded and controlled to represent information. It has been shown that certain desired chaotic orbits can be produced in a chaotic system by the application of small perturbations along a specific direction. Such perturbations will have the effect of locally stabilizing one the many intrinsic unstable periodic orbits buried in the chaos. See E. Ott, et al. "Controlling Chaos", 64 *The American Physical Society*, pp. 1196–1199, Mar. 12, 1990, which is incorporated by reference. See also U.S. Pat. No. 5,432,697, which is also incorporated by reference.

SUMMARY OF THE INVENTION

It was realized that a controlled chaotic system maintains the property of exponential sensitivity demonstrated by a "free" system. Additional disturbances, aside from control perturbations, affect the long term behavior of the system and are evident in the dynamics. There are many diverse physical systems capable of chaotic behavior. The class of signal capable of being reconstructed is dependent primarily upon the chaotic system chosen. In accordance with the teachings of the present invention the perturbation sequence needed to maintain a controlled orbit yields the information necessary to reconstruct a disturbance signal affecting it. In the present invention chaos is controlled by applying small perturbations at a position in state space along an unstable direction $e_u$. The unstable direction $e_u$ is defined as the direction of exponentiation about an unstable periodic orbit. Small perturbations along this direction will grow exponentially. However, applying these perturbations to the chaotic system properly will locally stabilize one of the intrinsic unstable periodic orbits buried in the chaos. The position in state space where the controlled perturbation is applied is called the Poincaré Surface of Section (PSS).

A periodic orbit, say period-one, will cross the PSS at the same point (period-one point) after a cycle time $\tau$. The control perturbation needed to maintain a periodic orbit is derived from the error, $\epsilon$, between the known period-one point and the true PSS crossing. Without control perturbations, this error will be exponentially amplified by the natural dynamics of the system until the system is undergoing free-running chaos.

A chaotic system under periodic control will produce a sequence of control perturbations. These control perturbations can be minimized by accurate estimation of the periodic point. In a noise-free system, this control sequence can be near zero. If an outside disturbance signal is coupled into the controlled system, the error at the PSS will be affected and become evident on the control perturbation sequence.

Near a periodic orbit, the unstable direction and strength of the exponentiation is quantifiable using the following equation through eigenvalue/eigenvector analysis:

$$Je = \Lambda e. \tag{1}$$

Where J is the Jacobian matrix, and $\Lambda = e^\Lambda$ is the exponentiation factor, or the rate of error expansion/compression along direction e. This factor may be time-varying as well. The direction of expansion, or the unstable direction $e_u, x$, is a useful parameter in control and exponential amplification.

A disturbance signal d(t), is coupled into the system through some means (e.g. current induced onto an inductor, voltage across an resistor, etc.). Its component along the unstable direction is determined by calculating the dot product of d with the unstable direction, that is:

$$d_u(t) = d \cdot e_u. \qquad (2)$$

This continuous-time signal can be decomposed into a sum of Dirac delta functions, that is:

$$d_u(t) = \sum_{t'} D_{t'} \delta(t - t'); \qquad (3)$$

Where $D_{t'}$ is the value of the function du(t) at time t', t is continuous time, and $_{t'}$ is discrete time.

Because of the inherent exponentiation of the system, an impulse function $\delta(t)$ is operated on by the system yielding the impulse response $h(t) = e^{(\tau-1)\Lambda}$. The derivation of this expression is well known to those skilled in the art and can be found in numerous engineering texts.

The discretized error at the PSS, caused by a continuous time disturbance signal which has a component in the unstable direction can be derived by the relationship:

$$\epsilon_n = d_u(t) * h(t), \qquad (4)$$

where * denotes a convolution integral. The convolution integral for any two time-varying functions, say g(t) and f(t), over an interval from 0 to $\tau$, is defined as:

$$f * g = \int_0^\tau g(t) f(\tau - t) dt$$

The control perturbation sequence is directly proportional to the error at the PSS. That is, $$p_n = \beta \epsilon_n, \qquad (5)$$

Where $p_n$ is the control perturbation sequence and $\epsilon_n$ is the discretized error at the PSS described above.

The characteristics of the disturbance signal determine how it can be reconstructed from the control perturbations. In the simple case it is a piece-wise linear reconstruction.

BRIEF DESCRIPTION OF THE DRAWINGS

All these aspects and others will be described with reference to the accompanying drawings, wherein.

DESCRIPTION OF THE PREFERRED EMBODIMENTS

Figure 1:
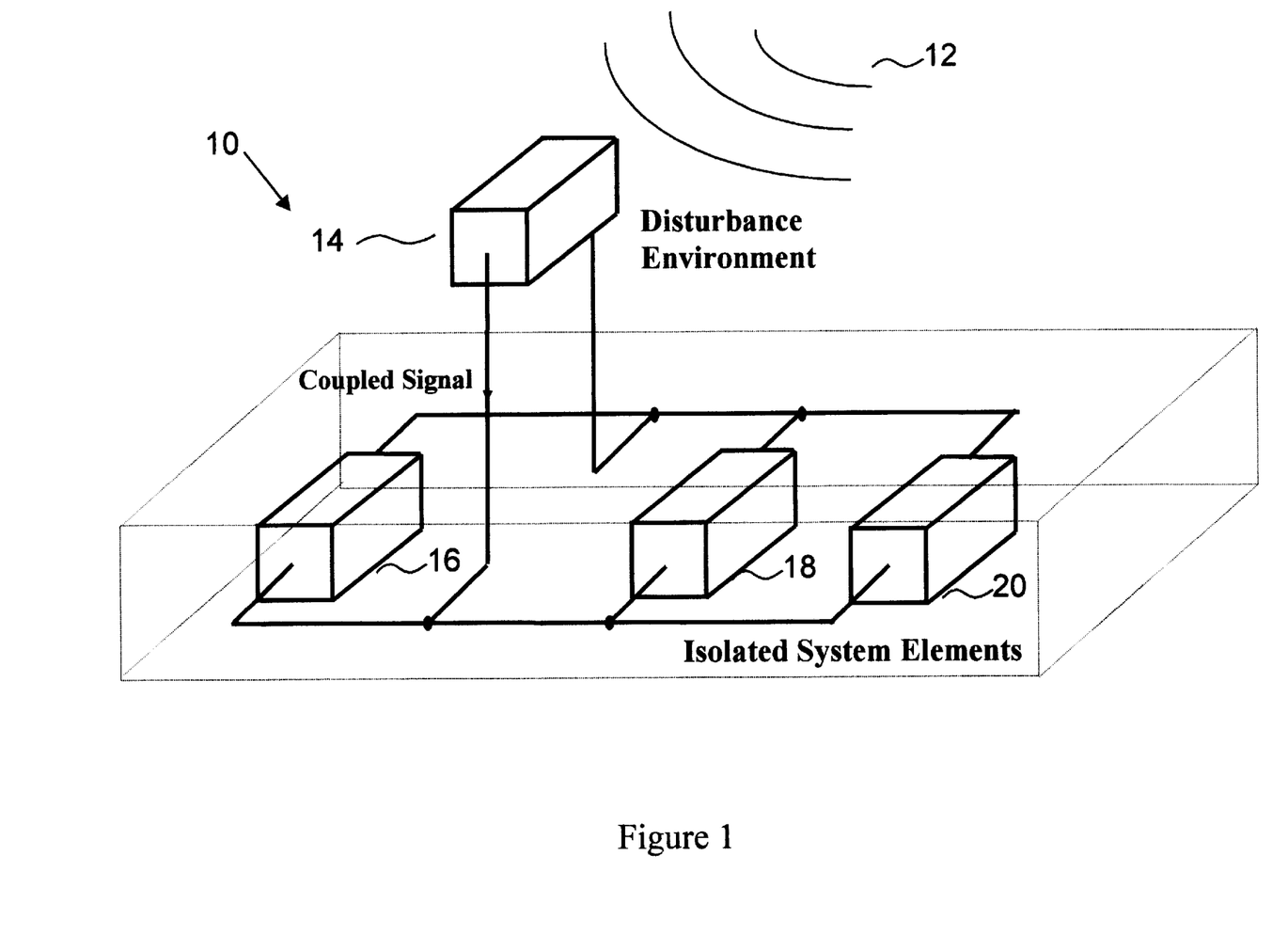
FIG. 1 shows a block diagram of a chaotic system having one set of elements exposed to a disturbance environment and another set isolated.

FIG. 1 shows a block diagram of one embodiment of the invention. The exponentially-amplified sampling and reconstructuring (ESR) system 10 senses an external signal or disturbance 12. One or more of the system elements 14 are exposed to the disturbance 12 and acts as a probe. The rest of the system elements are isolated from the environment. One or more of these isolated elements 16, 18 and 20 are tuned such that the system behaves in a desired chaotic manner. The influence of the disturbance 12 on the exposed element(s) is coupled into the system and is evident on the global dynamics.

Figure 2:
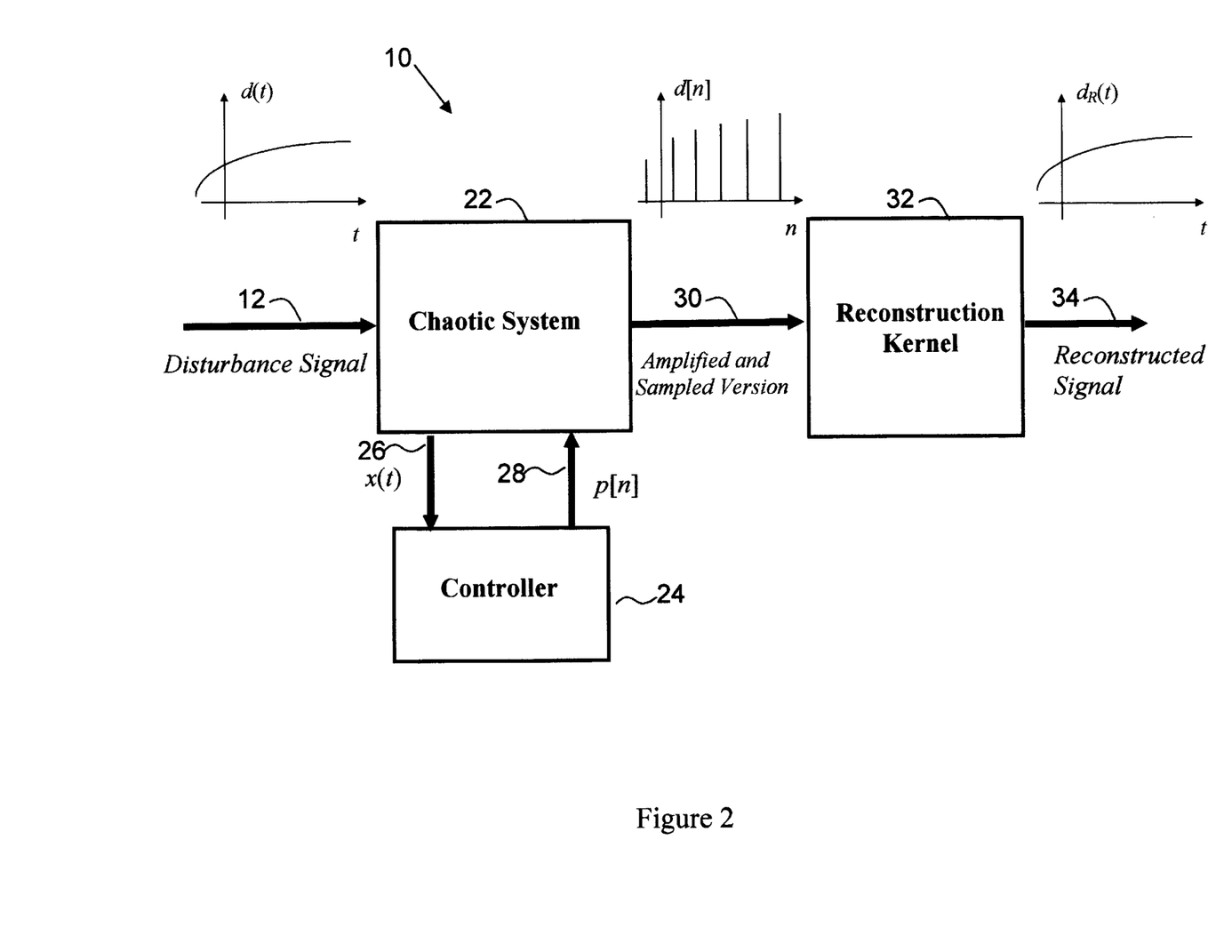
FIG. 2 shows a block-diagram of an exponentially-amplified sampling and reconstruction (ESR) system in accordance with the invention.

FIG. 2 shows a more detailed block diagram of the ESR system 10, The weak disturbance signal 12, d(t), is coupled into a chaotic system 22 in some manner. A controller element 24 samples an output 26, x(t), from the chaotic system and provides control pulses 28, p[n], in order to maintain a controlled orbit. Here, t is time and n is the sample number. An amplified and sampled version of the disturbance signal 30 d[n], is generated by the controller 24 in the manner described in detail below. This signal 30 is fed into a reconstruction kernel 32 which re-creates the continuous-time disturbance signal 34 $d_R(t)$ Reconstruction may not be necessary if one desires a discrete time sampling of the signal, since this is provided by the amplified and sampled signal 30 (d[n]). Exemplary graphs of d(t), d[n] and $d_r(t)$ are also shown in FIG. 2.

Figure 3:
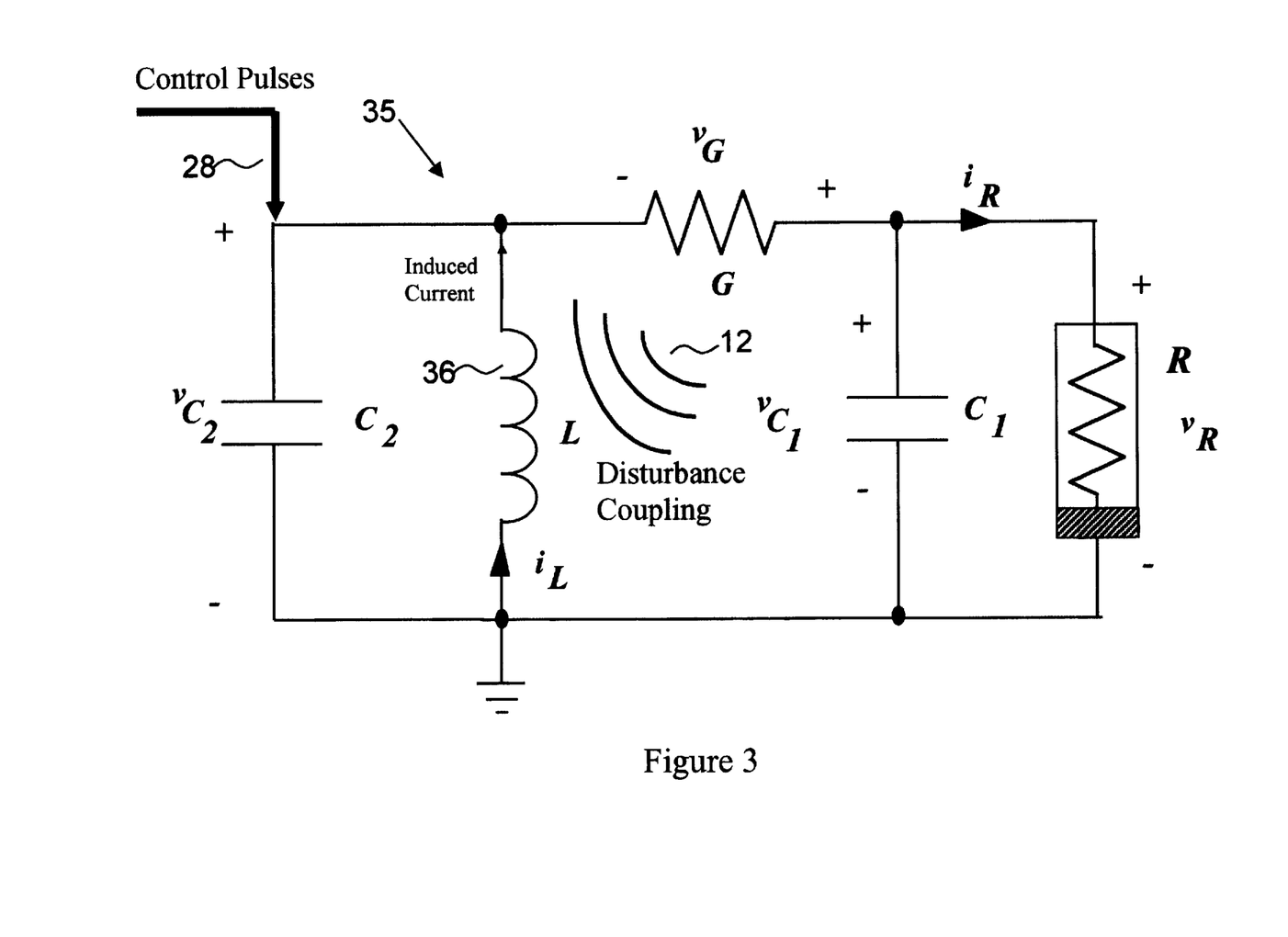
FIG. 3 shows a circuit diagram of a chaotic double-scroll electronic oscillator used in one embodiment of the present invention.

FIG. 3 shows a chaotic system in one embodiment of the invention. The double scroll oscillator (DSO) 35 comprises an electrical circuit which can be described by the following system of equations:

$$C_1 \frac{dv_{c_1}}{dt} = (v_{c_2} - v_{c_1})G - g(v_{c_1}) \qquad (6)$$

$$C_2 \frac{dv_{c_2}}{dt} = (v_{c_1} - v_{c_{21}})G + i_L \qquad (7)$$

$$L \frac{di_L}{dt} = -v_{c_2} \qquad (8)$$

Where $C_1$ and $C_2$ are capacitance values, G is the value of resistor G, L is the value of inductor L, $v_{c_1}$, $v_{c_2}$ are voltages across $C_1$ and $C_2$ and $i_R$ is the current through R. Also, g is a mathematical expression that describes the function relationship between current and voltage through nonlinear (piece-wise linear) active negative resistance element R ($-i_R = g(v_R)$). $V_{c1}$ is used instead of $v_R$ in the above equation since $v_{c1} = v_R$. This oscillator 20 is tuned suing these parameters to provide the type of chaos desired. This system of equations is capable of producing chaotic states suitable for chaotic system 22.

In the present invention, an inductor 36 is exposed to the disturbance signal 12. The disturbance signal 12 may be, for example, a magnetic field or an rf field. The inductor 36 can comprise an antenna or other type of sensor. The rest of the DSO 35 is isolated and tuned to provide the type of chaos needed. Control pulses 28 are injected as either voltages or currents, depending upon which is more convenient, in order to stabilize a periodic orbit. The voltages $v_{C1}$ and $v_{C2}$, along with the current $i_L$ are monitored in order to form a state space attractor for analysis. A state space attractor is defined as geometric region in a space described by the independent variables of the system (e.g. $v_{C1}$, $v_{C2}$, $i_L$) that the orbits tend to stay near. For a chaotic system this region is fractal in nature (having fractional dimension), and is sometimes referred to as a strange attractor.

Figure 4:
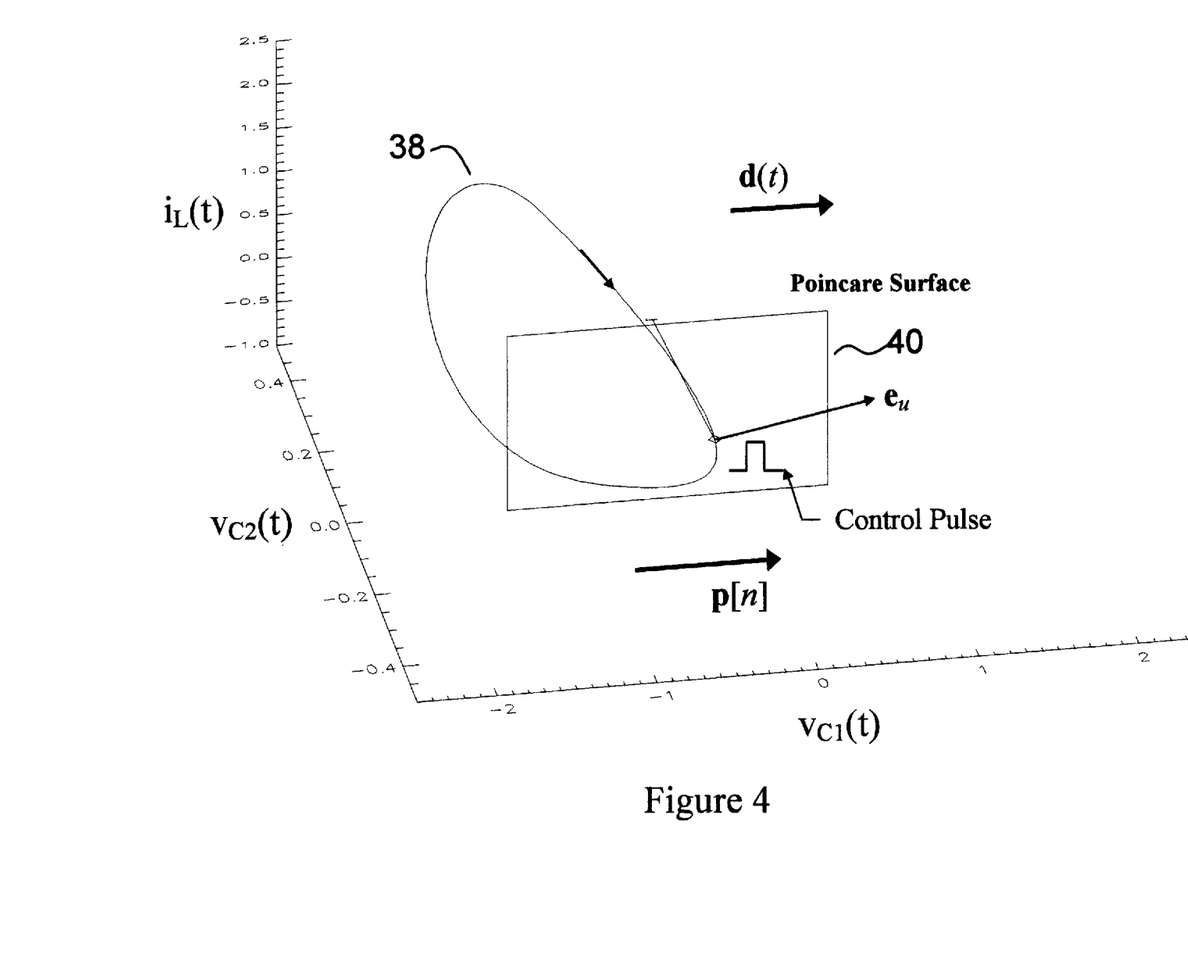
FIG. 4 shows a three-dimensional chaotic attractor generated by a chaotic system such as the one shown in FIG. 3.

FIG. 4 shows an example of such a state space attractor; this comprises a controlled period-one orbit 38 in the state space for the DSO 35. The x, y and z axis represents $v_{C_1}(t)$, $v_{C_2}(t)$ and $i_L(t)$ respectively. A PSS 40 is erected such that the state-space trajectory of the orbit 38 passes through it cleanly. That is, only one surface crossing per cycle occurs. The point where the trajectory passes the PSS is called the period-one point. Control pulses are applied commensurate with the error between the period-one point and the true trajectory crossing. The unstable direction $e_u$ is shown, as is the direction of the disturbance signal d(t), and the direction of the control perturbations p[n].

Figure 5:
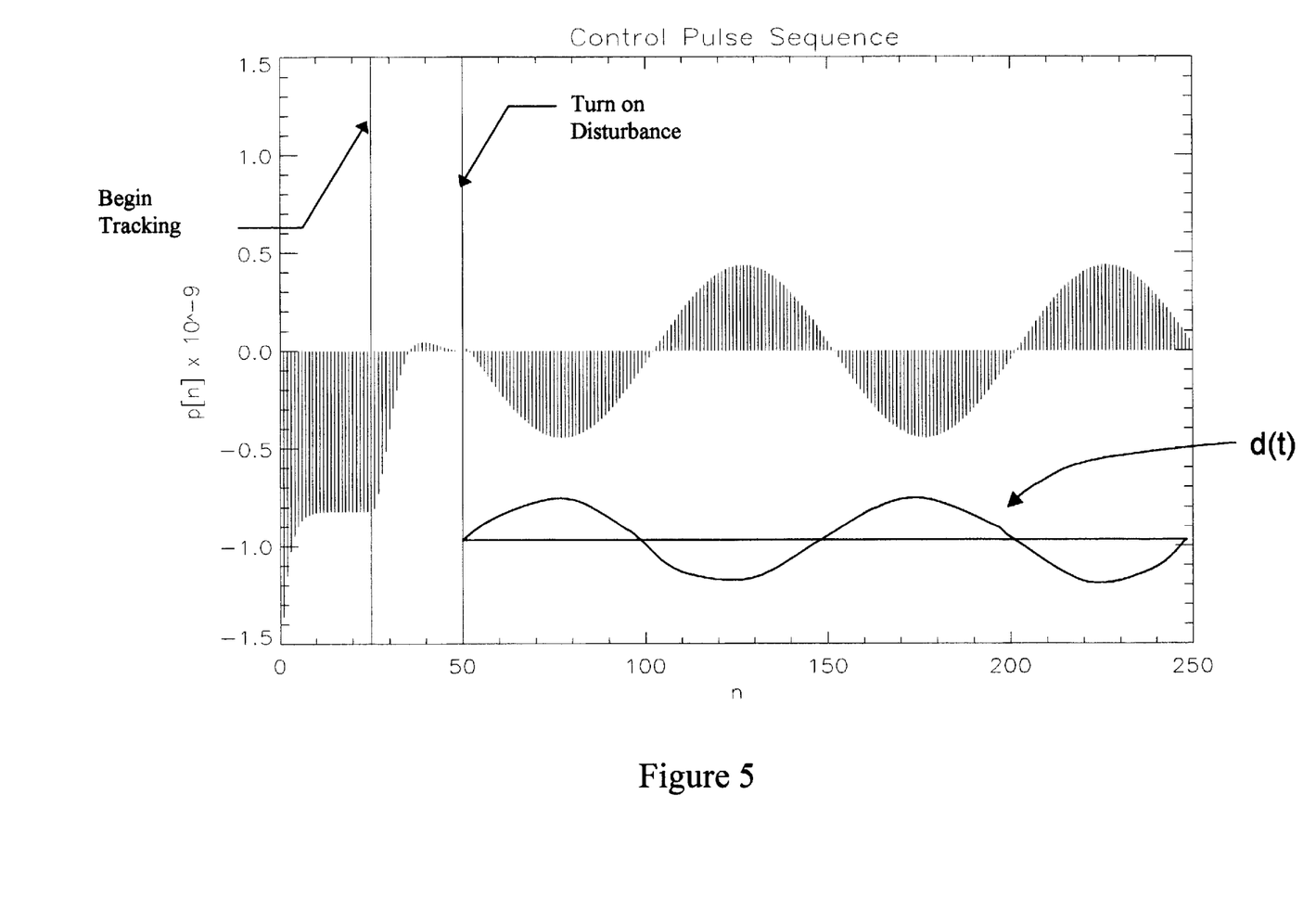
FIG. 5 shows a control pulse train with a sampled, amplified version of the disturbance signal impressed upon it in accordance with the invention.

FIG. 5 shows a plot of a control pulse p[n] sequence in one embodiment of the invention. Here p[n] is calculated according to equations 1–5 using a computer model of the DSO 35 with noise of magnitude $10^{-10}$ added. From n=0 to n=24 period-one is controlled freely from a pre-estimated fixed period-one point. Hence the control signal reaches a nearly constant level. From n=25 to n=49 corrections are sequentially made to the estimated periodic point. The result is to drive the control perturbation sequence to near-zero. At the $50^{th}$ surface crossing the previous tracking is turned off and a sinusoidal disturbance d(t) signal is introduced into inductor 36. This signal is described as:

$$d(t) = A\sin\left[\frac{2\pi}{\tau_d} t\right], \qquad (9)$$

where $A=10^{-10}$ is the amplitude of the oscillation and $\tau_d=100_\tau$ is its period. The disturbance oscillation is a simple sinusoidal one which varies 100 times slower than the chaotic oscillation. The period $\tau$ is the surface crossing time for period-one. The disturbance signal is slowly varying compared to the period of the controlled chaotic oscillator such that linear interpolation is sufficient for reconstruction to be performed by the reconstruction kernel 32. Thus, the reconstruction signal $d_r(t)$ can be constructed by simply connecting the amplitudes of each p[n] in FIG. 5 to form a sinusoidal wave. In other cases interpolation techniques based upon the known dynamical behavior of the system can be used. The maximum number of samples needed to reconstruct the signal is reduced in this case.

Figure 6:
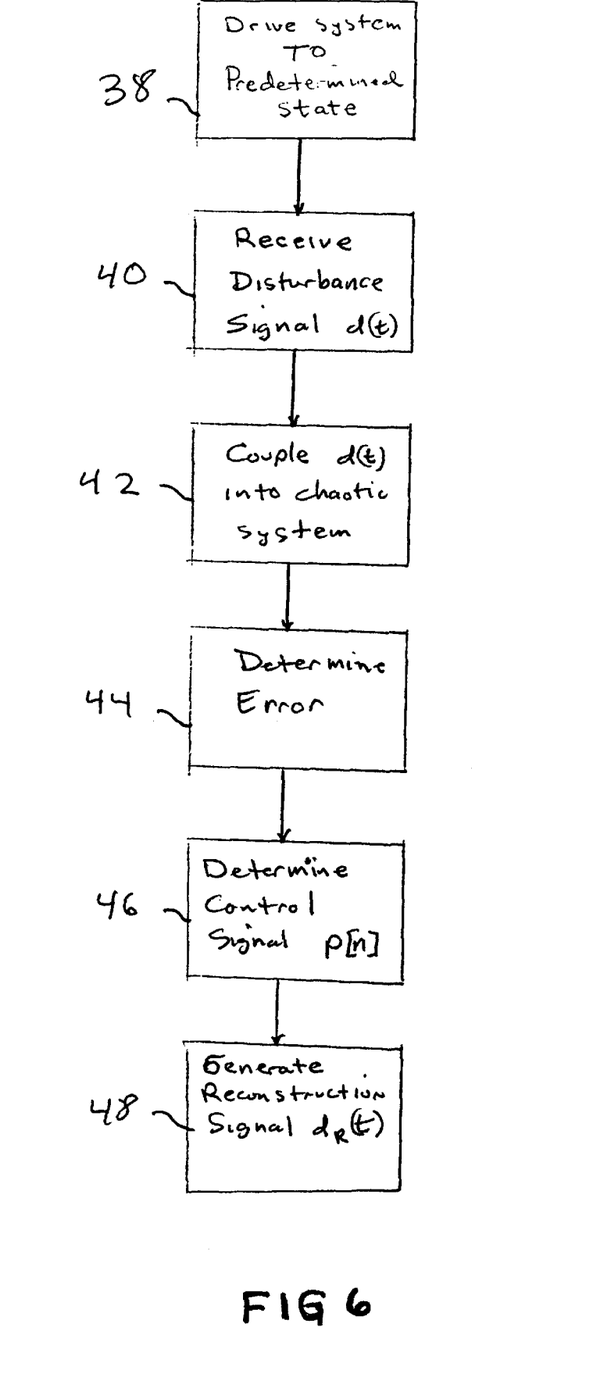
FIG. 6 shows a flowchart of the method of one embodiment of the invention.

FIG. 6 shows a flowchart of the method according to one embodiment of the invention. The steps of this flowchart will be performed by the ESR system 10 shown in FIG. 2. The ESR system 10 will drive a free running chaotic system to a predetermined state requiring a minimal correction signal p[n], as shown in block 38. A disturbance signal d(t) is then received by the ESR system, as shown in block 40. In block 42 the system couples the disturbance signal into the chaotic system 35. This alters the orbit 38 of the chaotic system 35 and generates an error. This error is calculated by the controller 24 using equation 4. As shown in block 46 the system next determines the control pulses p[n] based on the error using equation 5. The reconstruction kernel 32 then generates the reconstruction signal $d_R(t)$ from the control signal p[n].

The invention may be implemented in hardware or software, or a combination of both. The hardware implementation of the invention can be completely realized using analog devices. The control portion of the system can be derived from typical circuit elements which compare, amplify, and feedback. Analog (i.e. hardware) implementation would have the property of being extremely fast and responsive to changes in the overall detection system.

In software the invention is implemented in computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored in a storage media or device (e.g., ROM or magnetic disk) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein. The present inventions may be employed for a variety of users. Some specific applications include:

(A) Non-intrusive measurement systems (medical technology);

(B) Signal detection (communications systems);

(C) electronic device characterization;

(D) Seismic measurements; and (E) Astronomical measurement devices. In all of these and other applications, the techniques of the present invention will provide improved, efficient and effective signal detection and reconstruction.

Although only a few embodiments have been described in detail above, those having ordinary skill in the art will certainly understand that many modifications are possible in the preferred embodiment without departing from the teachings thereof. For example, other types of chaotic systems besides electronic oscillators may be used. Also other ways of sensing and coupling the disturbance signal may be employed.

All such modifications are intended to be encompassed with the following claims.

What is claimed is:

1. A method of detecting and reconstructing a signal comprising the steps of:

driving a time-varying system described by a state space to produce a set of parameters defining a varying trajectory in the state space of the system;

controlling the system so as to stabilize a periodic orbit of said trajectory in state space using control signals;

defining a surface in the state space through which the trajectory periodically intersects at a known point;

introducing a time-varying external signal into the time-varying system, the time-varying external signal altering the location of the point where the system trajectory intersects said surface from the known point to a new point;

detecting an error in state space between the known point and the new point;

determining a sequence of said control signals that corrects the point where the system trajectory intersects the surface from the new point to the known point; and reconstructing the time-varying external signal from said sequence of correcting control signals.

2. A method according to claim 1 wherein said step of driving a time-varying system comprises driving a chaotic system.

3. A method according to claim 1 further comprising the step of driving a time-varying electrical oscillator to produce said parameters.

4. A method according to claim 3 wherein said step of driving an electrical oscillator comprises the step of driving a double scroll oscillator and wherein said parameters thereby produced include varying voltages.

5. A method according to claim 1 wherein said control signals comprise electrical pulses.

6. A method according to claim 1 wherein said step of controlling the system comprises controlling the system such that said periodic orbit comprises a state space attractor.

7. A method according to claim 1 comprising the step of defining a Poincaré surface of section (PSS) in state space.

8. A method according to claim 1 wherein said step of determining an error vector includes the step of determining the unstable direction and strength of the error vector by eigenvalue/eigenvector analysis.

9. A method according to claim 1 wherein said step of determining a sequence of control signals comprises using said error vector to determine said sequence of correction control signals.

10. A method according to claim 9 wherein said step of determining an error vector includes the step of calculating the error $\epsilon_n$ using the equation $\epsilon_n = d_u(t) * h(t)$ wherein $d_u$ is the disturbance signal, * denotes a convolution integral, and h(t) is the response of the chaotic system to an impulse function.

11. A method according to claim 10 wherein said step of determining a sequence of control signals includes the step of calculating $p_n = \beta \epsilon_n$ where $p_n$ is the control sequence and $\beta$ is a constant.

12. A system for detecting a signal comprising:
a time-varying system described by a state space and controllable to produce a set of parameters defining a varying trajectory in the state space of the system;
a controller coupled to the time-varying system so as to stabilize a periodic orbit of said trajectory in state space using control signals;
means for defining a surface in the state space through which the trajectory periodically intersects at a known point;
a time-varying external signal introduced into the time-varying system, the time-varying external signal altering the location of the point where the system trajectory intersects said surface from the known point to a new point;
said controller detecting an error vector in said state space between the known point and the new point;
said controller determining a sequence of said control signals that correct the point where the system trajectory intersects the surface from the new point to the known point; and
means for determining characteristics of the time-varying external signal from said sequence of control signals.

13. A system according to claim 12 wherein said time-varying system comprises a chaotic system.

14. A system according to claim 12 wherein the time-varying system comprises a time-varying electrical oscillator.

15. A system according to claim 3 wherein said electrical oscillator comprises a double scroll oscillator and wherein said parameters produced include varying voltages.

16. A system according to claim 12 wherein said control signals comprise electrical pulses.

17. A system according to claim 12 wherein said controller controls the time varying-system such that said periodic orbit comprises a state space attractor.

18. A system according to claim 12 comprising means for defining a Poincaré surface of section in state space.

19. A system according to claim 12 wherein said processor includes a means for determining the unstable direction and strength of the error vector by eigenvalue/eigenvector analysis.

20. A system according to claim 12 wherein said processor includes a means for using said error vector to determine said sequence of correction control signals.

21. A system according to claim 19, wherein said processor includes a means for determining an error vector by calculating the error $\epsilon_n$ using the equation $\epsilon_n = d_u(t) * h(t)$ wherein $d_u$ is the disturbance signal, * denotes a convolution integral, and h(t) is the response of the chaotic system to an impulse function.

22. A method according to claim 19 wherein said means of using said error vector to determine a sequence of control signals includes means for calculating: $p_n = \beta \epsilon_n$ where p is the control sequence and $\beta$ is a constant.

23. A system for detecting signals comprising:
a dynamical system that exhibits exponential sensitivity to small perturbations, the dynamical system having periodic orbits controllable by input parameters;
an external signal coupled to the dynamical system so as to de-stabilize said dynamical system;
means for detecting the presence of the disturbance signal;
means for measuring a difference between said periodic orbit with and without the external signal coupled to the dynamic system;
a controller responding to said means for measuring a difference with a set of said input parameters that are a function of said error having the effect of stabilizing said periodic orbit, thereby reducing said error; and
means for reconstructing the disturbance signal from the stabilizing control signals.

24. A system according to claim 23 wherein said dynamical system is a chaotic system.

25. A system according to claim 23 wherein the dynamical system comprises a time-varying electrical oscillator.

26. A system according to claim 25 wherein said electrical oscillator comprises a double scroll oscillator and wherein said parameters produced include varying voltages.

27. A system according to claim 23 wherein said control signals comprise electrical pulses.

28. A system according to claim 23 wherein said controller controls the dynamical system such that said periodic orbit comprises a state space attractor.

29. A system according to claim 23 comprising means for defining a Poincaré surface of section in state space.

30. A system according to claim 23 wherein said processor includes a means for determining the unstable direction and strength of the error vector by eigenvalue/eigenvector analysis.

31. A system according to claim 23 wherein said processor includes a means for using said error vector to determine said sequence of correction control signals.

32. A system according to claim 30, wherein said processor includes a means for determining an error vector by calculating the error $\epsilon_n$ using the equation $\epsilon_n = d_u(t) * h(t)$ wherein $d_u$ is the disturbance signal, * denotes a convolution integral, and h(t) is the response of the chaotic system to an impulse function.

33. A method according to claim 30 wherein said means for using said error vector to determine a sequence of central signals includes means for calculating: $p_n = \beta E_n$ where p is the control sequence and β is a constant.

34. A method for detecting signals comprising:
driving a dynamical system that exhibits exponential sensitivity to small perturbations, the dynamical system having periodic orbits controllable by input parameters;
coupling an external signal to the dynamical system so as to de-stabilize said dynamic system;
detecting the presence of the external disturbance signal;
measuring a difference between said periodic orbit with and without the external signal coupled to the dynamical system;
responding to said difference with a set of control signals that are a function of said error having the effect of stabilizing said periodic orbit, thereby reducing said error; and
reconstructing the disturbance signal from the stabilizing control signals.

35. A method according to claim 34 comprising of the step of driving a chaotic electrical oscillator.

36. A method according to claim 35 comprising the step of driving a double scroll oscillator and wherein said parameters produced include varying voltages.

37. A method according to claim 34 comprising the step of controlling the dynamical system such that said periodic orbit comprises a state space attractor.

38. A method according to claim 34 comprising the step of defining a Poincaré surface of section (PSS) in state space.

39. A method according to claim 34 comprising the step of determining the unstable direction and strength of the error vector by eigenvalue/eigenvector analysis.

40. A method according to claim 34 comprising the step of using said error vector to determine said sequence of correction control signals.

41. A method according to claim 40, comprising the step of determining an error vector by calculating the error $\epsilon_n$ using the equation $\epsilon n = d_u(t) * h(t)$ wherein $d_u$ is the disturbance signal, * denotes a convolution integral, and h(t) is the response of the chaotic system to an impulse function.

42. A method according to claim 34 wherein said step of using said error vector to determine a sequence of central signals includes calculating: $p_n = \beta E_n$ where p is the control sequence and β is a constant.

43. A computer program residing on a computer-readable medium for detecting signals, the computer program comprising instructions for causing a computer to:
drive a dynamical system that exhibits exponential sensitivity to small perturbations, the dynamical system having periodic orbits controlled by input parameters;
detect the presence of an external disturbance signal coupled to the dynamical system so as to de-stabilize said dynamic system;
measure a difference between said periodic orbit with and without the external signal coupled to the dynamical system;
generate a set of control signals that are a function of said error having the effect of stabilizing said periodic orbit, thereby reducing said error; and
reconstruct the disturbance signal from the stabilizing control signals.

* * * * *